United States Patent
Khachane et al.

(10) Patent No.: US 12,045,203 B2
(45) Date of Patent: Jul. 23, 2024

(54) SYSTEMS AND METHODS FOR PHYSICAL CAPACITY ESTIMATION OF LOGICAL SPACE UNITS

(71) Applicant: EMC IP Holding Company LLC, Hopkinton, MA (US)

(72) Inventors: Hemant P. Khachane, Sunnyvale, CA (US); Paul J. Hammer, Livermore, CA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 464 days.

(21) Appl. No.: 17/304,106

(22) Filed: Jun. 14, 2021

(65) Prior Publication Data
US 2022/0398220 A1    Dec. 15, 2022

(51) Int. Cl.
*G06F 16/174*    (2019.01)
*G06F 16/17*    (2019.01)

(52) U.S. Cl.
CPC ...... *G06F 16/1748* (2019.01); *G06F 16/1727* (2019.01)

(58) Field of Classification Search
CPC ............... G06F 16/1748; G06F 16/1727
See application file for complete search history.

(56) References Cited

U.S. PATENT DOCUMENTS

| | | | |
|---|---|---|---|
| 7,424,498 B1 * | 9/2008 | Patterson | G06F 12/0253 707/999.102 |
| 9,922,043 B1 * | 3/2018 | Smith | G06F 16/27 |
| 10,078,583 B1 * | 9/2018 | Wallace | G06F 11/1453 |
| 10,114,751 B1 * | 10/2018 | Faith | G06F 12/0871 |
| 10,235,285 B1 * | 3/2019 | Wallace | G06F 3/0652 |
| 10,310,889 B1 * | 6/2019 | Olgiati | G06F 9/54 |
| 10,866,871 B1 * | 12/2020 | Niemann | G06F 3/0665 |
| 11,237,958 B1 * | 2/2022 | Schatzl | G06F 12/0891 |

(Continued)

OTHER PUBLICATIONS

Flajolet et al., "HyperLogLog: the analysis of a near-optimal cardinality estimation algorithm", Discrete Mathematics and Theoretical Computer Science (DMTCS) (Year: 2007).*

(Continued)

*Primary Examiner* — Irete F Ehichioya
*Assistant Examiner* — Huen Wong
(74) *Attorney, Agent, or Firm* — WOMBLE BOND DICKINSON (US) LLP

(57) ABSTRACT

Systems and methods of determining physical capacity of logical space units are disclosed. The method populates a first smart filter to track a physical capacity of a first logical space unit (LSU). The method adds fingerprints from the first LSU to register(s) of the first smart filter. The method populates a second smart filter to track fingerprints deleted by garbage collection (GC). The method adds the deleted fingerprints to register(s) of the second smart filter. Using the first and second smart filters, the method determines an intersection cardinality of the first LSU and the deleted fingerprints. The method determines a cardinality of unique fingerprints in the first LSU based on the intersection cardinality of the first LSU and the deleted fingerprints. The method determines the physical capacity of the first LSU based at least on the cardinality of unique fingerprints in the first LSU.

20 Claims, 10 Drawing Sheets

(56) References Cited

U.S. PATENT DOCUMENTS

| | | | |
|---|---|---|---|
| 2013/0159261 A1* | 6/2013 | Dewey | G06F 16/1748 707/E17.014 |
| 2015/0120684 A1* | 4/2015 | Bawaskar | G06F 16/137 707/693 |
| 2015/0269178 A1* | 9/2015 | Rhodes | G06F 16/958 707/700 |
| 2016/0134674 A1* | 5/2016 | Fujimori | H04L 65/60 709/219 |
| 2016/0179894 A1* | 6/2016 | Gupta | G06F 16/2456 707/714 |
| 2017/0300528 A1* | 10/2017 | Qin | G06F 16/2453 |
| 2018/0225316 A1* | 8/2018 | Boles | G06F 16/2246 |
| 2018/0246649 A1* | 8/2018 | Datar | H03M 7/3091 |
| 2018/0300363 A1* | 10/2018 | Ertl | G06N 7/01 |
| 2019/0026491 A1* | 1/2019 | Telford | G06F 21/6227 |
| 2020/0250164 A1* | 8/2020 | Halstead | G06F 16/27 |
| 2021/0056586 A1* | 2/2021 | Bao | G06Q 30/0205 |
| 2021/0359846 A1* | 11/2021 | Wright | H04L 9/0643 |
| 2022/0171693 A1* | 6/2022 | Skvortsov | G06F 16/2462 |
| 2023/0004534 A1* | 1/2023 | Khachane | G06F 16/1756 |

OTHER PUBLICATIONS

Heule et al., "HyperLogLog in Practice: Algorithmic Engineering of a State of The Art Cardinality Estimation Algorithm", ACM (Year: 2013).*

Garg et al., "Probabilistic Data Structures-Based Anomaly Detection Scheme for Software-Defined Internet of Vehicles", IEEE (Year: 2020).*

Otmar, Ertl, "New cardinality estimation algorithms for HyperLogLog sketches", downloaded from https://oertl.github.o/hyperloglog-sketch-estimation-paper/paper/paper.pdf, Apr. 3, 2017, 56 pages total.

Flajolet, Philippe, et al., "HyperLogLog: the analysis of a near-optimal cardinality estimation algorithm", Discrete Mathematics and Theoretical Computer Science (DMTCS), 2007 Conference on Analysis of Algorithms, A of A 07, DMTCS proc. AH, 2007, pp. 127-146.

Grzywinski, Rob, et al., "GitHub—aggregateknowledge/js-hll: JavaScript library for the HyperLogLog algorithm", downloaded from https://github.com/aggregateknowledge/js-hll, last updated Dec. 23, 2013, 6 pages total.

Huele, Stefan, et al., "HyperLogLog in Practice: Algorithm Engineering of a State of The Art Cardinality Estimation Algorithm", EDBT/ICDT '13, Mar. 18-22, 2013, Genoa Italy, 10 pages total.

\* cited by examiner

[ Cardinality of Smart Filter A 340 ] ≈ |A|     [ Cardinality of Smart Filter B 350 ] ≈ |B|

FIG. 3C max( [ Cardinality of Smart Filter A 340 ] , [ Cardinality of Smart Filter B 350 ] ) = [ Cardinality of Union of Smart Filters A & B 360 ] ≈ |A ∪ B|

FIG. 3D compare( [ Cardinality of Smart Filter A 340 ] , [ Cardinality of Smart Filter B 350 ] ) = [ Intersection Cardinality of Smart Filters A & B 360 ] ≈ |A ∩ B|

SYSTEMS AND METHODS FOR PHYSICAL CAPACITY ESTIMATION OF LOGICAL SPACE UNITS

FIELD OF THE INVENTION

Embodiments of the present disclosure relate generally to data storage systems. More particularly, embodiments of the disclosure relate to physical capacity estimation of logical space units in a deduplication-based system.

BACKGROUND

In a deduplicated file system where a single instance of unique block/segment is maintained, it is very difficult to predict the physical capacity across different logical space units (e.g., Merkle trees or Mtrees) on premise or in cloud. In a typical customer deployment of a deduplicated file system,
 1. physical capacity estimation and reporting of logical space units should be accurate and data structures used for space estimation of logical space units should be space efficient (i.e., consumes less memory and storage),
 2. physical capacity reporting of logical space units should have ability to tell physical space (or physical capacity) between different logical space units in the deduplicated file system,
 3. a capacity calculator that can tell about space usage of logical space units on the same data deduplication storage system or across other data deduplication storage systems should be provided,
 4. the physical capacity of logical space units should be calculated in real time,
 5. a cleanup estimate on logical space units should be provided after every garbage collection (GC) run, and
 6. a capacity calculator that can estimate physical capacity of groups of logical space units in local or distributed systems (e.g., in cloud/on premise) should be provided.

The physical capacity estimation of a logical space unit (e.g., Mtree) in a deduplicated file system can be seen as a is cardinality estimation problem, where the same data segment is accounted for multiple times when it is referenced in more than one files (due to deduplication). In an existing data deduplication storage system, a logical space unit is provided. The logical space unit provides an independent namespace and is a logical partition of the file system. The logical space unit can be used as a common Internet file system (CIFS) share and/or network file system (NFS) export storage unit. The data deduplication storage system can have several logical space units which may share a physical space due to data deduplication. However, the data deduplication presents a problem as it is difficult to identify the physical capacity of the logical space unit (e.g., Mtree). There are several use cases where the physical capacity of the logical space unit is required, such as:
 1. in an independent storage vendor (ISV) environment, where the ISV can charge end-users based on logical capacity,
 2. in order to have better deduplication, logical space units that share physical blocks that can be grouped together in a cloud environment (for better storage utilization),
 3. replicating a logical space unit that has a problem in providing an estimate of how much time replication would take to complete. This can be estimated if an accurate physical capacity estimator of logical space units can be provided,
 4. a good capacity estimator can help to identify the amount of object store (e.g., S3/blobstore) that needs to be provisioned in the cloud environment, and
 5. physical capacity can be used to move files around using managed file replication to group files with better deduplication together in a cloud or physical host.

Moreover, the existing implementation of a data deduplication storage system can have several problems. First, such implementation generally uses random sampling of fingerprints. Random sampling does not yield correct cardinality. Sampling can provide a false estimation of space and thus, all the data segments should be accounted to obtain a true cardinality. Second, the existing implementation is based on many false assumptions, such as no Lp sharing (even with a file and directory copier, e.g., FastCopy), average local compression ratio, and deduplication and segment size are independent. Third, a bloom filter is needed to represent all fingerprints for every file. Fourth, there are file deletion issues in case of a race between interaction sequences of file manager (FM)/directory manager (DM) and physical capacity reporting (PCR). Fifth, additional overhead (e.g., extra memory and central processing unit (CPU) consumption) in maintaining separate attribute Btrees and executing PCR jobs. Sixth, inaccurate reporting in cases where Lp sharing occurs (e.g., FastCopy). Seventh, the existing data deduplication storage system counts logical space of Lp's (instead of physical space) and its implementation is based on the counting of bloom filters and futuristic min-heap implementation with cardinality principle and Jacardian index.

Additionally, in the existing data deduplication storage system, the exact counting of unique fingerprints across logical storage units (e.g., Mtrees) is challenging, especially when scale is very large, such as thousands of billions of objects/fingerprints. As such, the traditional approach of using HashMap and Bitmap (with zero collision) does not work well. Even if distinct fingerprints are mapped with 1 bit (though zero collision is not possible with 1 bit but it is still hypothetically assumed), still for storing billions of fingerprints, $2^{30}$ bits are needed, which is close to 128 MB. With petabytes of system having 200-300 billion of fingerprints, this will increase to size to approximately $2^{37}$ (close to 16 GB). While min-hash is a better solution, it also need log 2(n) space.

Bit vectors can provide exact counts, but the space complexity is linear with the size of the set, and one must either allocate a large bit vector upfront or cope with the complexity of dynamically resizing the bit vector as the set grows. Providing a manual mapping from members of a set to an interval of integers is sometimes a non-trivial task. Counts, unions, and intersections are all linear-time operations in the size of the universe of the set being represented.

Bloom filters can be much more compact than bit vectors, but the actual count associated with a Bloom filter is an artifact of the construction of the data structure, so the cost of estimating a union or intersection is linear in the size of the Bloom filter. Getting a high probability guarantees on the quality of the estimate of Bloom filter counts requires several "good" hash functions that have some degree of independence from each other. In practice, coming up with several independent implementations of good hash functions is difficult. Bloom filters require that all of their space be allocated upfront (thus, re-hashing is not possible without replaying all events). As such, in practice one would need some estimate of how large the counters are going to be before allocating the counter.

Furthermore, the existing implementation uses counting of Bloom filters and does random sampling to choose objects/fingerprints for restricting the Bloom filter size. However, in cardinality random sampling does not yield accurate results. Maintaining it for each file (even with less number of bits) cannot be the correct choice for predicting cardinality.

BRIEF DESCRIPTION OF THE DRAWINGS

Embodiments of the invention are illustrated by way of example and not limitation in the figures of the accompanying drawings in which like references indicate similar elements.

FIGS. 3A-3E are block diagrams illustrating a system of smart filter processing according to an embodiment.

DETAILED DESCRIPTION

Figure 1:
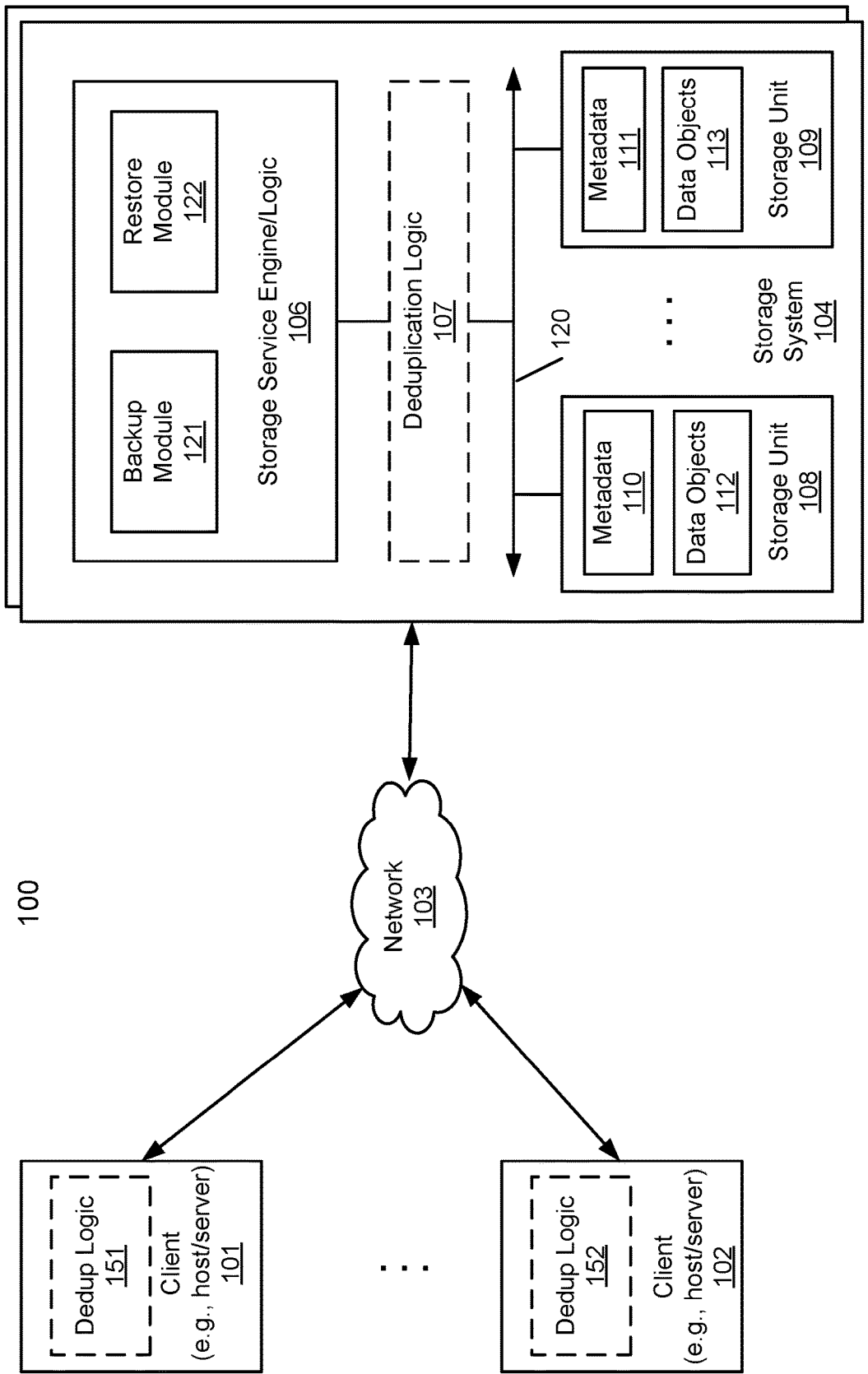
FIG. 1 is a block diagram illustrating a storage system according to an embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the disclosure seek to solve the above described problems using a compact memory data structure and a powerful algorithm that uses extremely efficient space and predicts the best accuracy. The data structure may be HyperLogLog (HLL)/HLL++, which may be used to perform a LogLog-based cardinality estimation. That is, the HLL/HLL+ data structure may be used to estimate the physical capacity of a logical space unit (e.g., M-tree) in a deduplicated file system.

In some embodiments, a smart filter (e.g., HLL object or instance) is maintained for each logical space unit (e.g., Mtree) where the smart filter may use an HLL data structure. The HLL data structure may be used for making decision of uniqueness and accuracy with an error rate <1%. Since the smart filter is maintained for the entire logical space unit, it is more space efficient than the existing implementation (e.g., PCR). Accordingly, the smart filter is more efficient, optimal, and compact, as compared to for example, bit vectors, counting of Bloom filters, and Min-Hash.

Moreover, the smart filter can be used to calculate the physical capacity of each logical space unit. The smart filter is space efficient as it uses a probabilistic counting technique. It can perform an estimation of cardinality (e.g., distinct counts) based on a maximum number of trailing/leading zeroes in a binary representation of a number (or a fingerprint). As an example, using a smart filter (as described in more detail herein), one billion distinct items can be counted with an accuracy of <2% using only 1.5 kilobytes (KB) of space. However, such accuracy can be higher (e.g., error rate <1%) if the number of registers of the smart filter (e.g., HLL registers) is increased.

In some embodiments, an 80 KB smart filter may be maintained for each logical space unit. The smart filter, for example, may provide the following:
1. A distinct count of segments in a logical space unit,
2. A determination as to how many segments are shared or unique between two logical space units (e.g., Mtrees),
3. A reset after a garbage collection (GC) run as GC cleans up the deleted blocks and the smart filter can be populated on the fly, either by complete scan or by performing, for example, a Btree difference (dateless snapshots).
4. An amount of physical data (e.g., segments) referred by a group of logical space units (e.g., Mtrees) by estimating a union of a smart filter maintained for each logical space unit, and
5. A tracking of the segments freed up during GC run, which can in turn be used to tell the segments cleaned by GC run in each logical space unit.

In some embodiments, a unique sketch cardinality problem can be solved using an effective data structure and algorithm, for example, HLL. The HLL sketch builds on prior work on approximate counting in $O(\log 2 \log 2(n))$ space. This method estimates a count by possibly incrementing a counter with exponential decaying probability. The probability is typically halved after each increment, so the counter approximates the log 2 of the true count. While the estimator is unbiased, it has high variance. By requiring only log 2 log 2(n) bits to store a summary, as compared to the log 2(n) needed for a MinHash, it would allow the storage of additional total summaries, and after averaging, achieve a better estimate. The HLL combines many such counters into one sketch and it can calculate a harmonic mean.

According to one aspect, a method of determining physical capacity of logical space units in a deduplicated file system are described. The method includes populating a first smart filter to track a physical capacity of a first logical space unit. The method further includes adding fingerprints from the first logical space unit to one or more registers of the first smart filter. The method further includes populating a second smart filter to track fingerprints deleted by garbage collection. The method further includes adding the deleted fingerprints to one or more registers of the second smart filter. The method further includes using the first smart filter and the second smart filter to calculate a number of segments in the first logical space unit that are freed by the garbage collection by determining an intersection cardinality of the first logical space unit and the deleted fingerprints. The method further includes determining a cardinality of unique fingerprints in the first logical space unit based at least on the intersection cardinality of the first logical space unit and the deleted fingerprints. The method further includes determining the physical capacity of the first logical space unit based at least on the cardinality of unique fingerprints in the first logical space unit.

In an embodiment, the method further includes using the first smart filter the determine a cardinality of the first logical space unit. In an embodiment, determining the cardinality of unique fingerprints in the first logical space unit includes determining the cardinality of unique fingerprints in the first logical space unit based on (i) the intersection cardinality of the first logical space unit and the deleted fingerprints and (ii) the cardinality of the first logical space unit.

In an embodiment, the method further includes determining an L0 average segment size of the first logical space unit. In an embodiment, determining the physical capacity of the first logical space unit comprises determining the physical capacity of the first logical space unit based on (i) the cardinality of unique fingerprints in the first logical space unit and (ii) the L0 average segment size of the first logical space unit.

In an embodiment, using the first smart filter and the second smart filter to determine the intersection cardinality of the first logical space unit and the deleted fingerprints includes: using the first smart filter to determine a cardinality of the first logical space unit, using the second smart filter to determine a cardinality of the deleted fingerprints, using the first smart filter to determine a cardinality of a union of the first logical space unit and the deleted fingerprints, and determining the intersection cardinality of the first logical space unit and the deleted fingerprints based on (i) the cardinality of the first logical space unit, (ii) the cardinality of the deleted fingerprints, and (iii) the cardinality of the union of the first logical space unit and the deleted fingerprints.

In an embodiment, the method further includes populating a third smart filter to track a physical capacity of a second logical space unit, adding a plurality of fingerprints from the second logical space unit to one or more registers of the third smart filter, using the first smart filter and the third smart filter to determine an intersection cardinality of the first logical space unit and the second logical space unit, determining a cardinality of unique fingerprints in the second logical space unit based at least on the intersection cardinality of the first logical space unit and the second logical space unit, and determining the physical capacity of the second logical space unit based at least on the cardinality of unique fingerprints in the second logical space unit.

In an embodiment, the method further includes using the third smart filter the determine a cardinality of the second logical space unit, and using the second smart filter to determine a cardinality of the deleted fingerprints. In an embodiment, determining the cardinality of unique fingerprints in the second logical space unit comprises determining the cardinality of unique fingerprints in the second logical space unit based on (i) the intersection cardinality of the first logical space unit and the second logical space unit, (ii) the cardinality of second first logical space unit, and (iii) the cardinality of the deleted fingerprints.

In an embodiment, the method further includes determining an L0 average segment size of the second logical space unit. In an embodiment, determining the physical capacity of the second logical space unit comprises determining the physical capacity of the second logical space unit based on (i) the cardinality of unique fingerprints in the second logical space unit and (ii) the L0 average segment size of the second logical space unit.

FIG. 1 is a block diagram illustrating a storage system according to an embodiment. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

Data deduplication is a process by which a data storage system can detect multiple identical copies of data and only keeps a single copy of that data, thus eliminating the redundant data by removing other copies of that data and thus improving storage utilization. In at least some systems, data deduplication requires iterating over set of data blocks in one or more storage extents, finding the blocks that contain identical information by processing digest information associated with each block and mapping the identical blocks to a single copy of the data. In such systems, an index table of unique digests is created to find commonality among the data set. When a deduplicated data block is updated with a new content, a new data block is created containing the new updated content. Mapping of the deduplicated block is then changed to point to the new data block and the deduplicated block no longer points to the single copy of the data. This process is referred to as reduplication.

Data deduplication can operate at a file or a block level. File deduplication eliminates duplicate files (as in the example above), but block deduplication processes blocks within a file and saves unique copy of each block. For example, if only a few bytes of a document or presentation or a file are changed, only the changed blocks are saved. The changes made to few bytes of the document or the presentation or the file do not constitute an entirely new file. The sharing of file system data blocks conserves data storage for storing files in a data storage system. The snapshot copy facility is a space saving technology that enables sharing of file system data blocks among versions of a file. On the other hand, a deduplication facility enables the sharing of file system data blocks within a file, among versions of a file, between versions of a file and unrelated files, and among unrelated files. Therefore, the deduplication facility eliminates from the data storage system any file system data blocks containing duplicative data content.

Deduplication of data happens in two logically distinct operations: detection and remapping. The detection operation identifies blocks containing the same data. The remapping operation updates address maps that record physical locations of logical units (LUNs) of data so that a single block of data is shared by multiple LUNs or by multiple positions within the same LUN. Detection is accomplished by building a database (e.g., index table) that maintains a digest (e.g., SHA, checksum) and, a deduplication key for each data block. When two data blocks have the same digest they have a sufficiently high probability of containing the same data to warrant a bit-for-bit comparison to confirm they are exact duplicates.

A goal of deduplication logic 107 is to maintain only a single copy of each unique set of data within a data set. To achieve that goal, deduplication logic 107 finds data blocks that have not been deduplicated and processes data blocks for deduplication by computing digests for data blocks. A digest is a representation of contents stored in a data block. Further, the digest is mathematically computed (e.g., MD5, SHA-1, SHA-2) in such a way that, computationally, there is a very low or zero probability of finding two data blocks that have the same digest but different contents. If the digest for the data block is sent together with the data block, a recipient of the data block can compute a new digest from the received data block and can compare the new digest with the received digest to determine whether the received data block is valid. Additionally, a digest is stored in an index table in order to process data blocks within the data set for deduplication. Further, a deduplication key identifying a data block is also stored in index table along with the digest for the data block.

A deduplication key uniquely identifies a data block by storing information (such as logical address, physical address) of the data block. Deduplication logic 107 identifies data blocks that can potentially be deduplicated by comparing digests of data blocks with list of digests stored in the index table. Further, when data blocks are deduplicated after comparing digest information, deduplication logic 107 updates metadata of deduplicated data blocks. Additionally, deduplication logic 107 updates metadata of a data block when the data block is reduplicated.

With continued reference to FIG. 1, in an embodiment, any of clients 101-102 may further include an optional deduplication logic (e.g., deduplication logic 151-152) having at least a portion of functionalities of deduplication logic 107. Deduplication logic 151-152 are configured to perform local (or on-premise) deduplication operations, respectively. For example, prior to transmit data to storage system 104, each of the deduplication logic 151-152 may deduplicate the data into deduplicated segments and determine whether a particular deduplicated segment has already been stored in storage system 104. A deduplicated segment is transmitted to storage system 104 only if the deduplicated segment has not been stored in storage system 104.

For example, when client 101 is about to transmit a data stream (e.g., a file or a directory of one or more files) to storage system 104, deduplication logic 151 is configured to deduplicate the data stream into deduplicated segments. For each of the deduplicated segments, client 101 transmits a fingerprint or representative of the deduplicated segment to storage system 104 to determine whether that particular deduplicated segment has already been stored in storage system 104. A deduplicated segment that has been stored in storage system 104 may be previously received from the same client 101 or from another client such as client 102. In response to a response from storage system 104 indicating that the segment has not been stored in storage system 104, that particular segment is then transmitted over to the storage system 104. As a result, the network traffic or bandwidth and the processing resources required can be greatly reduced.

Figure 2:
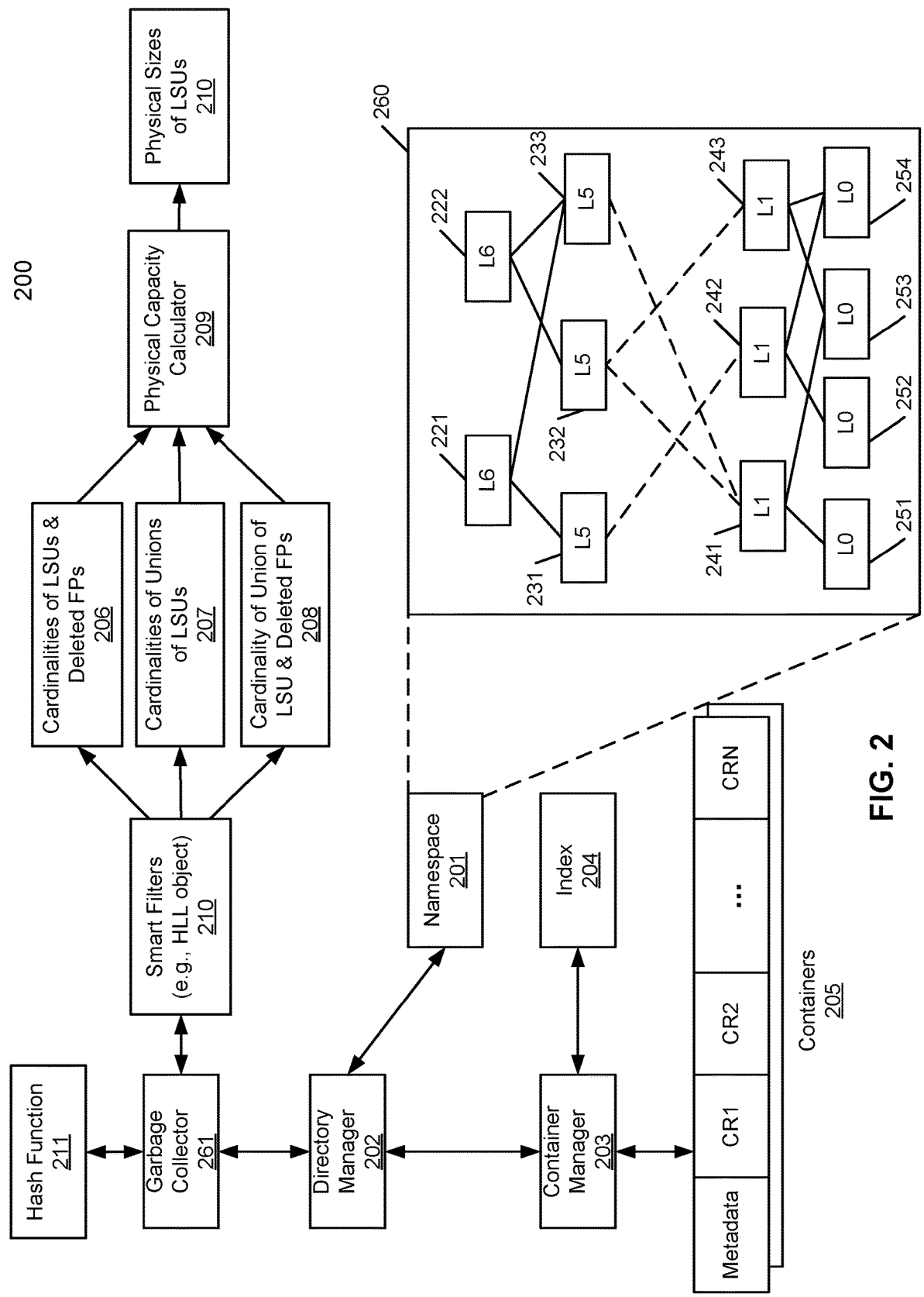
FIG. 2 is a block diagram illustrating a storage system according to another embodiment.

FIG. 2 is a block diagram illustrating a storage system according to another embodiment. System 200 may be implemented as part of storage system 104 of FIG. 1. Referring to FIG. 2, garbage collector 261 traverses namespace 201 via directory manager 202, where directory manager 202 is configured to manage files stored in a file system of the storage system 104. In a deduplicated file system, one or more files may be represented in a logical space unit 260 (such as a file tree, e.g., Merkle or Mtree) having one or more levels of segments in a multi-level hierarchy. Thus, multiple logical space units may exist in the deduplicated file system. In this particular example, there are seven levels L0 to L6 in logical space unit 260, where L6 is the root level, also referred to as a top parent level. More or fewer levels may be applied herein. Each upper level contains one or more references to one or more lower level segments. In one embodiment, an upper level segment contains a fingerprint (e.g., metadata) of fingerprints of its child level segments. Only the lowest level segments (e.g., L0 segments) are the actual data segments containing the actual deduplicated segments. Thus, L1 to L6 are segments only contain metadata of their respective child segments(s), referred to herein as Lp segments.

In one embodiment, when garbage collector 261 traverses namespace 201 via directory manager 202, it obtains the fingerprints of the root level segments, in this example, L6 segments, as part of content handles from namespace 201. Based on the fingerprints of the current level segments, container manager 203 can identify which of the containers 205 in which the segments are stored based on indexing information from index 204. Index 204 may be maintained in the system memory (e.g., volatile memory) and/or in a storage device (e.g., non-volatile memory). Index 204 includes information mapping a fingerprint to a storage location that stores a segment represented by the fingerprint. In one embodiment, index 204 may be a fingerprint-to-container identifier (FP/CID) index that maps a particular fingerprint to a container that contains the corresponding segment or a compression region (CR) having the segment stored therein.

The metadata (e.g., fingerprints) and the data section of the current level segments can be obtained from the identified container. A container may contain metadata or fingerprints of all segments stored therein, where segments are compressed into a compression region. A segment can be obtained by retrieving the entire container or the corresponding compression region from the storage device or disk. Based on the metadata or the data section of a current level segment, its child segment or segments can be identified, and so on. Throughout this application, for the purpose of illustration, a container contains one or more compression regions and each compression region contains one or more segments therein. However, the techniques may also be applied to other storage layouts.

With continued reference to FIG. 2, in an embodiment, there are two components responsible to manage the files in the system. The first one is directory manager 202, which is a hierarchical mapping from the path to the inode representing a file. The second one is a content store (not shown), which manages the content of the file. Each file has a content handle (CH) that is stored in the inode that is created by content store every time the file content changes. Each CH represents a file that is abstracted as a logical space unit (e.g., logical space unit 260) of segments. In this example, a logical space unit or file tree can have up to 7 levels: L0, . . . , L6. The L0 segments represent user data (e.g., actual data) and are the leaves of the tree. The L6 is the root of the segment tree. Segments from L1 to L6 are referred to as metadata segments or Lp segments. They represent the metadata of the file. An L1 segment is an array of L0 references. Similarly an L2 is an array of L1 references and so on. A segment is considered live if it can be referenced by any live content in the file system.

The file system packs the segments into containers 205 which are written to a disk in a log-structured manner. The log-structured container set has a log tail and a log head. New containers are always appended at the head of the log. Each container is structured into sections. The first section is the metadata section and the following sections are compression regions. A compression region is a set of compressed segments. In the metadata section all the references or fingerprints that identify the segments in the container. The metadata further includes information identifying a content type, which describes the content of the container. For instance, it describes which compression algorithm has been used, which type of segments the container has (L0, . . . , L6), etc. Container manager 203 is responsible to maintain the log-structured container set and provide a mapping from container identifiers (CID) to block offset on disk. This mapping may be maintained in memory. It also contains additional information, e.g., the content type of each container.

In the example as shown in FIG. 2, segment 221 includes a fingerprint of fingerprints of segments 231 and 233, and segment 222 includes a representation (e.g., a fingerprint) of fingerprints of segments 232-233, and so on. Some of the segments, such as segment 233, are referenced shared by multiple parent level segments (e.g., segments 221-222). Thus, segments 221-222, 231-233, and 241-243 only contain data representing the metadata of their respective child segments. Only segments 251-254 contain the actual user data.

In an embodiment, directory manager 202 (or another processing logic) may populate and maintain a smart filter (e.g., HLL/HLL++ object or instance) in the storage system for each logical space unit (e.g., logical space unit 260). Thus, multiple smart filters 210 may be populated and maintained in system 200 prior to the traversal or processing of the logical space units. In an embodiment, smart filters 210 may be implemented using HL/HLL++.

In an embodiment, when a segment has been processed or traversed (e.g., by garbage collector 261), the fingerprint or metadata of the segment is applied to a hash function 211 (e.g., collision-free hash function) which yields a hash value. In one embodiment, hash function 211 is a perfect hash function. A perfect hash function for a set S is a hash function that maps distinct elements in S to a set of integers, with no collisions. A perfect hash function has many of the same applications as other hash functions, but with the advantage that no collision resolution has to be implemented.

In an embodiment, hash function 211 is generated based on the fingerprints of the segments (e.g., a set of fingerprints) stored in the storage system prior to performing the traversal of the namespace 201. That is, prior to performing any garbage collection, a processing logic such as garbage collector 261 may scan all fingerprints of the segments that are involved in the garbage collection to generate a collision-free hash function for those involved segments. If the garbage collection is performed based on a subset of segments (e.g., a range of fingerprints), for each subset, a corresponding hash function may be specifically generated based on the fingerprints of the segments involved in that particular subset.

In an embodiment, the hash values returned by hash function 211 may be used to index into one or more registers (also referred to as buckets) of a smart filter 210. A register may include one or more fingerprints of a corresponding logical space unit, or one or more deleted fingerprints by garbage collector 261. Each smart filter may combine cardinality estimates of its registers to produce a cardinality of its corresponding logical space unit or deleted fingerprints (by garbage collector 261). Thus, as shown in block 206 of FIG. 2, smart filters 210 may produce or estimate multiple cardinalities of respective logical space units (LSUs) and one or more cardinalities of deleted fingerprints (FPs). Furthermore, each smart filter may compute or estimate a cardinality of the union of its corresponding logical space unit and another logical space unit. Thus, as shown in block 207 of FIG. 2, multiple cardinalities of unions of LSUs may be produced or estimated by smart filters 210. Also, as shown in block 208 of FIG. 2, a smart filter may calculate or estimate a cardinality of the union of its corresponding logical space unit and deleted FPs (by garbage collector 261).

Based on the cardinalities of LSUs and deleted FPs 206, cardinalities of unions of LSUs 207 and cardinalities of union of LSU and deleted FPs 208, physical capacity calculator 209 may determine the physical size (or physical capacity) of each logical space unit in system 200. Thus, physical capacity calculator 209 may generate multiple physical sizes of respective LSUs 210, as shown in FIG. 2. For example, using the various cardinalities 206-208, physical capacity calculator 209 may determine an intersection cardinality of a first logical space unit (e.g., Mtree1) and a second logical space unit (e.g., Mtree2) and also an intersection cardinality of a logical space unit (e.g., Mtree1) and the deleted FPs. Based on cardinalities 206-208 and the determined intersection cardinalities, physical capacity calculator 209 may determine or estimate a cardinality of unique fingerprints exist in each logical space unit. For each logical space unit, using the cardinality of the unique fingerprints in the logical space unit and an L0 average segment size of the logical space unit, physical capacity calculator 209 can determine the physical size (or physical capacity) of the logical space unit (e.g., logical space unit 260).

In more detail, in an embodiment, a smart filter 210 may be populated by performing a director manager (DM) enumeration followed by an Lp scan of a corresponding logical space unit. There are several ways in which the capacity of the logical space unit can be computed incrementally. For instance, when a file is ingested and during file verification, a logical space unit (e.g., logical space unit 260) can be scanned through and fingerprints in the logical space unit (e.g., L0 fingerprints) can be dumped or added in a smart filter 210 associated with the logical space unit. Thus, for each logical space unit, a smart filter 210 may be populated using file verification at the start with the assumption that garbage collector 261 was not run. Performing this at the logical space unit level directly would enable the file verification to dump L0 fingerprints into the smart filter 210 associated with the logical space unit. However, this may need an extra operation to identify the cardinality of the smart filter 210 by comparing that cardinality against a cardinality of another smart filter 210 maintained by garbage collector 261. In an embodiment, a smart filter 210 may be stored for every logical space unit in DM attribute data structure (e.g., B-tree). As an example, each page of the DM attribute data structure may be 64 KB (though the page can be of any size), so the number of pages used may be based on the size of the smart filter 210 and the total number of fingerprints in system 200. For example, for thousands of billions of fingerprints, about 1-4 pages may be used given the nature of the data structure used by smart filter 210 (e.g., HLL data structure). In a maximum case with 256 logical space units (e.g., Mtrees) and 4 pages for a smart filter 210 per logical space unit, for example, about $256*64*4 \approx 64$ MB are needed for all smart filters and all logical space units (in a worst case scenario).

In an embodiment, during garbage collection run, another smart filter 210 may need to be maintained, where the fingerprints getting deleted can be added or dumped into the smart filter 210. Even with a large number of fingerprints (e.g., in the range of billions), the size required for the smart filter 210 is very small, and thus it can be populated without any collision.

In an embodiment, while reporting the physical capacity of a number logical space units (e.g., LSU1, LSU2, LSU3, ..., LSUn), at least two smart filters 210 are needed to be considered at a given time. The more number of logical space units exist in the system 200, the more common segments may exist among them. For example, the cardinality of a first logical space unit (LSU1), e.g., Mtree1, using a first smart filter is |LSU1|. After garbage collection, the cardinality of the deleted fingerprints using a second smart filter is |Deleted FPs|. Next, physical capacity calculator 209 may determine or estimate the cardinality of the total unique fingerprints (FPs) that exist in LSU1 by using a union functionality (in the smart filter 210) to find out an intersection between the deleted fingerprints (by garbage collection) and LSU1. The intersection may be performed to calculate the number of segments in LSU1 that are freed by garbage collection, and it can be determined as follows:

(Unique FPs in LSU1)=|LSU1|−(|LSU1∩Deleted FPs|), where (|LSU1∩Deleted FPs|)=|LSU1|+|Deleted FPs|−(|LSU1∪Deleted FPs|).

For a subsequent logical space unit (LSU2), the calculation is different. In an embodiment, physical capacity calculator 209 may determine or estimate the cardinality of the total unique FPs that exist in LSU2 as follows:

(Unique FPs in LSU2)=(|LSU2|−|Deleted FPs|)−(|LSU1∩LSU2|), where (|LSU1#LSU2|)=|LSU1|+|LSU2|−(|LSU1∩LSU2|).

The above algorithms or formulas can be expanded for other LSUs (e.g., LSU3, LSU4, ..., LSUn).

In an embodiment, every time garbage collection is run, a new smart filter 210 needs to be maintained. As such, an older smart filter needs to be saved so that when physical capacity is reported, the older smart filter can be used for extracting identical fingerprints and then reporting the physical capacity. In an embodiment, the older smart filter can be stored in an attribute data structure (e.g., B-tree), written in a form of a container, or stored in a memory during PCR initialization.

In an embodiment, smart filter 210 may not have the mechanism to selectively delete hashes included in the smart filter, so the above-described method is needed to track the deleted segments by garbage collector 261. Thus, this provides the ability to track the deleted segments in each logical space unit (e.g., Mtree). In an embodiment, similar to a garbage collection schedule, a new smart filter per logical space unit can be formed and an older smart filter can be terminated based on a schedule.

After the number of unique fingerprints that exist in a logical space unit can be determined or estimated, in an embodiment, physical capacity calculator 209 needs to determine an L0 average segment size in the logical space unit. The method to determine the L0 average segment size is generally well known to people skilled in the art. Based on the number of unique fingerprints and the L0 average segment size, physical capacity calculator 209 can estimate the total physical size or capacity of the logical space unit by taking, for example, the product of the number of unique fingerprints and the L0 average segment size.

In some embodiments, in a distributed set (e.g., at a global scale), a smart filter can be maintained at each individual node level. The smart filters may be aggregated to get the physical capacity of a subcluster, and thus, use cases such as copying data from different nodes to a single (maximum cap system) can be estimated. The use cases may include, but not limited to, the amount of data that can be shared among nodes, distinct blocks in storage appliance pool, etc. This will assist the prediction of data migration/replication time.

FIGS. 3A-3E are block diagrams illustrating a system of smart filter processing (e.g., HLL processing) according to an embodiment. The system of FIGS. 3A-3D may be performed as part of system 200 of FIG. 2.

Figure 3A:
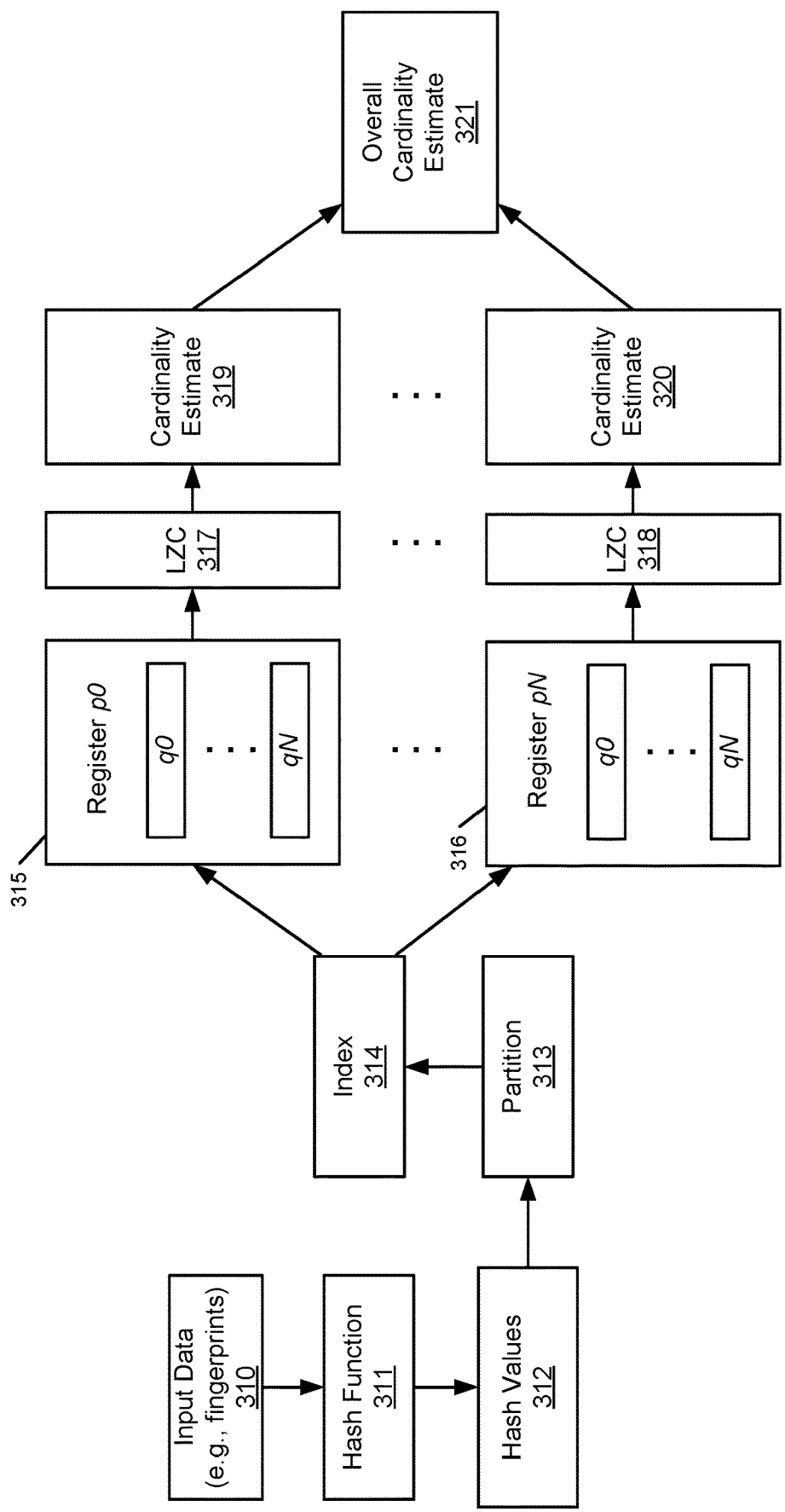

Referring to FIG. 3A, input data 310 (e.g., stream of fingerprints of a logical space unit) may be hashed by hash function 311 (which may be similar to or the same as hash function 211 of FIG. 2) to produce hash values 312. Each hash value may be partitioned, by partition 313, into a prefix p and a suffix q. In an embodiment, prefix p may be the most significant bits of the hash value. Prefix p may be used to index into an array of registers (or buckets) 315-316 included in a smart filter populated and maintained for a logical space unit (e.g., Mtree). Note that while two registers 315-316 are illustrated, any number of registers may exist in the system of FIG. 3A.

In an embodiment, each register (e.g., register 315/316) may include a maximum leading zero count (LZC) (e.g., LZC 317/318) among the suffixes q that are mapped to that register. As described in more detail herein below, register-level estimates may be combined to obtain an overall cardinality estimate of the smart filter or corresponding logical space unit.

As an example, in an embodiment, if fp is input data 310 and H is hash function 311, the value H(fp) is partitioned (by partition 313) so that H(fp)=p xor q for a bit string prefix p and suffix q. To insert fp, p may be used as an offset into an array of k-bit registers (e.g., registers 315-316). A register may be updated to equal either its current value or the LZC of suffix q (e.g., LZC 317/318), whichever is greater (see FIG. 3B for three example registers). Note that the LZC of fingerprint string x of length q is related to log 2(x), as follows:

$$LZC(x)=\{q, x=0\}$$

$$LZC(x)=\{q-1-\log_2(x), x>0\}$$

Figure 3B:
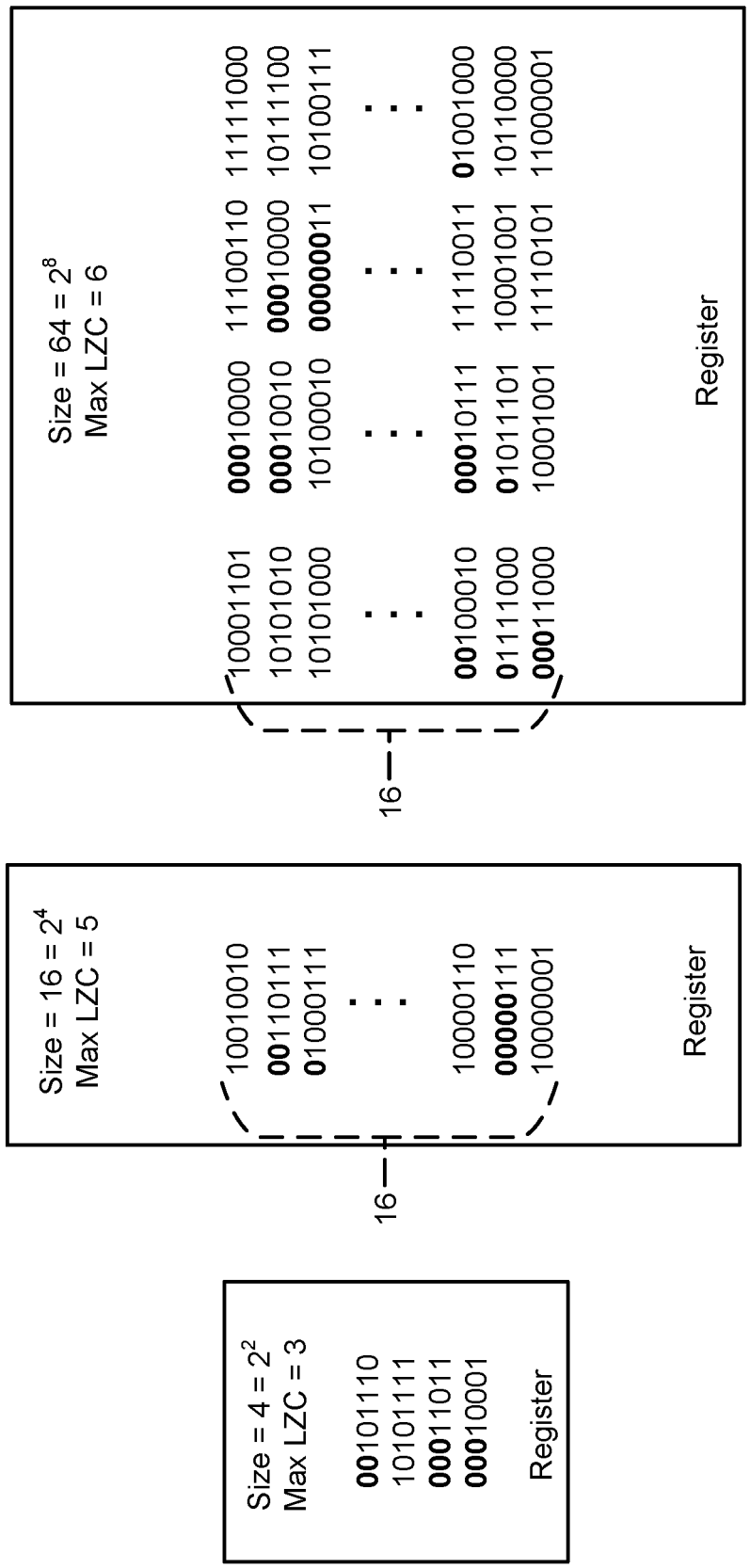

FIG. 3B shows the relationship between the maximum LZC and set size for three example registers having randomly generated sets of k-bit numbers (k=8 in the example of FIG. 3B). In an embodiment, the maximum LZC approximately estimates the log 2 of the set size, though with high variance. In FIG. 3B, two of the three estimates may be off by 2-fold. Thus, for a very small set of k-bit numbers, the estimation may not be accurate.

Referring back to FIG. 3A, after the register-level estimates (e.g., cardinality estimates 319-320) across registers 315-316 are generated, they can be combined, for example, by taking their harmonic mean and applying a correction factor (e.g., averaging and bias correction) to produce overall cardinality estimate 321.

Referring to FIG. 3C, the cardinalities of a pair of smart filters (labelled as Set A and Set B) are respectively estimated, for example, using a cardinality estimation function of the smart filters (e.g., HLL objects). Each of cardinalities 340-350 may be produced by the system of FIG. 3A (i.e., an overall cardinality estimate). In FIG. 3D, a union of the smart filters A, B are calculated and the cardinality of the union 360 is estimated, for example, using a union function and the cardinality estimation function of the smart filters. In FIG. 3E, an intersection cardinality of the smart filters A, B is estimated using, for example, an inclusion-exclusion principle or Ertl's JMLE method.

Figure 4:
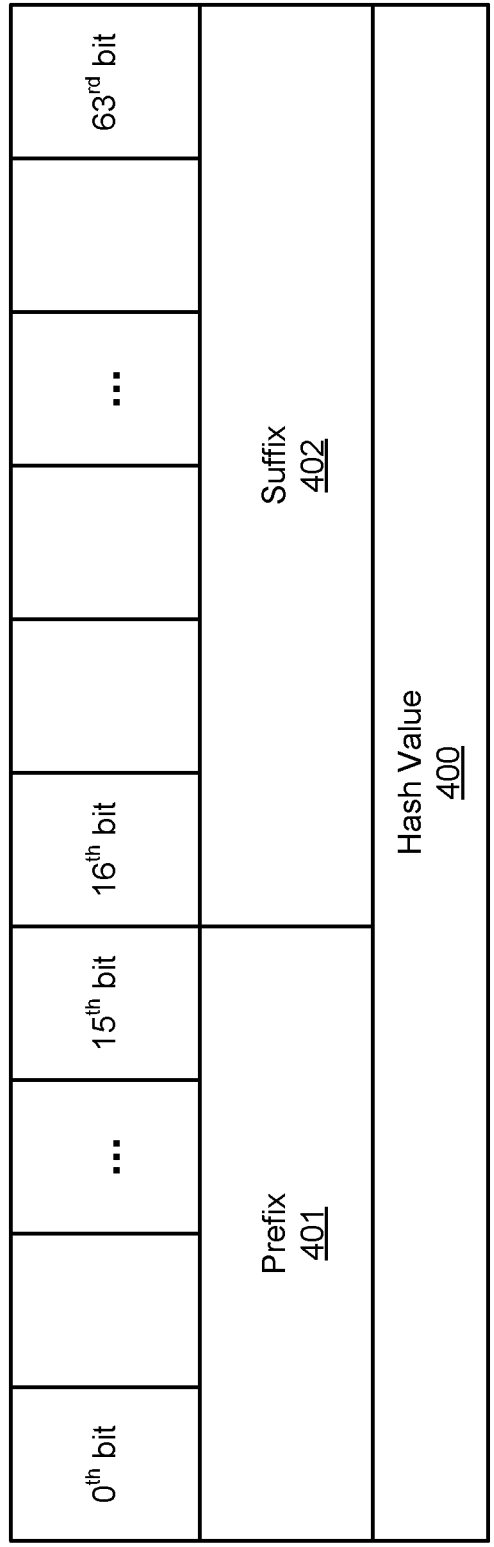
FIG. 4 is a block diagram illustrating an example hash value of a fingerprint according to an embodiment.

FIG. 4 is a block diagram illustrating an example hash value of a fingerprint according to an embodiment. In FIG. 4, hash value 400 may be any hash value of hash values 312 in FIG. 3A. In this example, hash value 400 may be assumed to be a 64-bit hash, though hash value 400 may be any k-bit hash, where k is a positive integer. Thus, if 16 bits are used as a register pointer (prefix 401), then there are 48 bits remaining to run LZC (suffix 402). Moreover, if prefix 401 is 16 bits, then 65,536 registers (or buckets) are needed in each smart filter (M=$2^{16}$=65,536). This would produce for example a desired accuracy of ~100% and an expected error of about 1.04/sqrt($2^{16}$)=1.04/256=0.004062.

In an embodiment, a register may be required to be large enough to support a maximum value of 48 bits (the maximum possible number of leading zeros). Generally, a 5-bit register is too small ($2^5$−1=31). On the other hand, a 6-bit register (register size p=6), as an example, is large enough ($2^6$−1=63). Thus, the data structure of a smart filter (e.g., HLL data struct) may be $2^{16}$*6-bit register=393,216 bits=48 KB. However, to increase accuracy, an 80 KB smart filter data structure may be used for each logical space unit, as an example.

Figure 5:
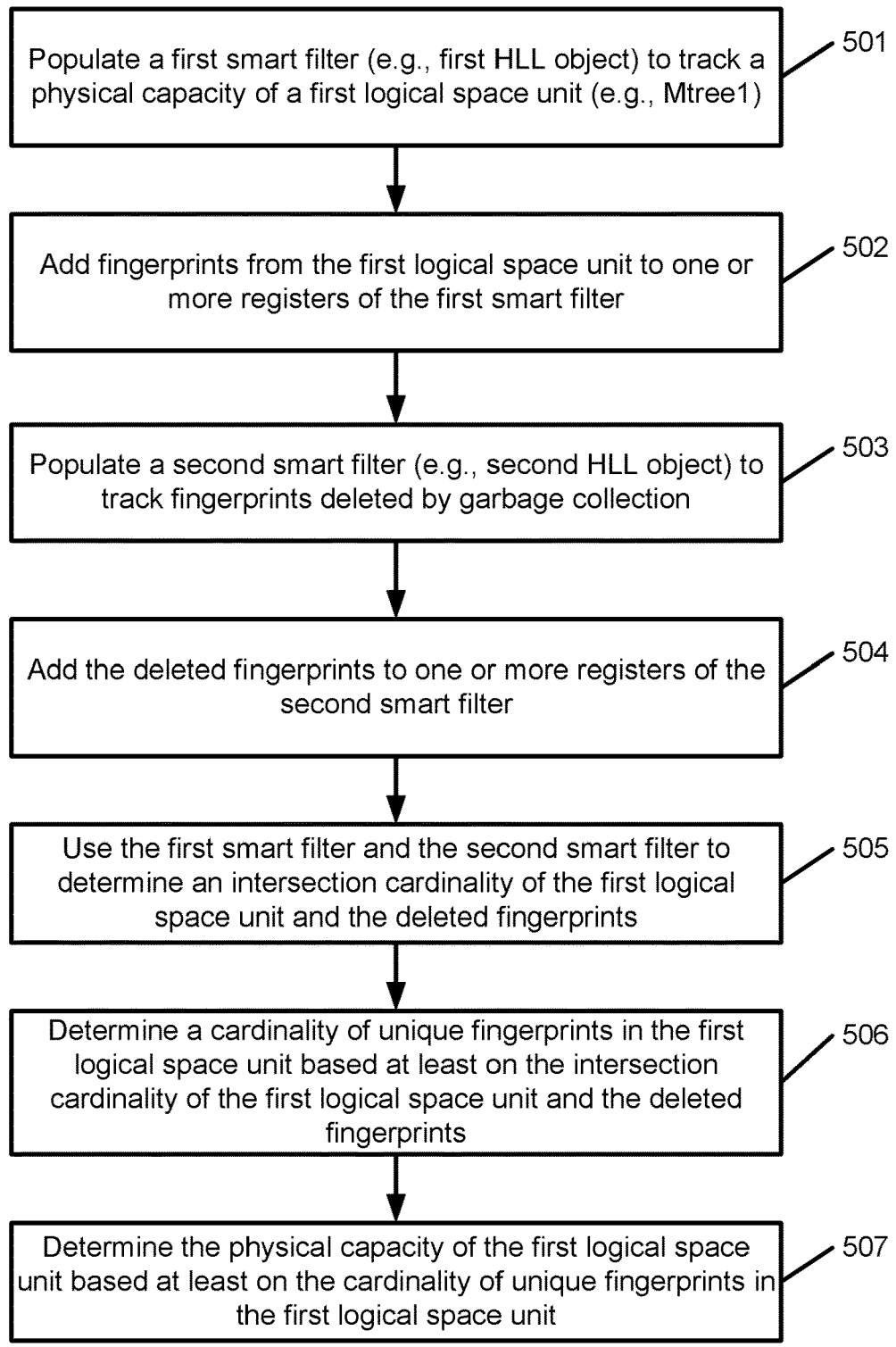
FIG. 5 is a flow diagram illustrating a process of determining a physical capacity of a logical space unit according to an embodiment.

FIG. 5 is a flow diagram illustrating a process of determining a physical capacity of a logical space unit according to an embodiment. Process 500 may be performed by processing logic that includes hardware (e.g. circuitry, dedicated logic, etc.), software (e.g., embodied on a non-transitory computer readable medium), or a combination thereof. For example, process 500 may be performed by system 200 of FIG. 2.

Referring to FIG. 5, at block 501, the processing logic may populate a first smart filter (e.g., first HLL object) to track a physical capacity of a first logical space unit (e.g., Mtree1). At block 502, the processing logic may add fingerprints from the first logical space unit to one or more registers of the first smart filter. At block 503, the processing logic may populate a second smart filter (e.g., second HLL object) to track fingerprints deleted by garbage collection. At block 504, the processing logic may add the deleted fingerprints to one or more registers of the second smart filter. At block 505, the processing logic may use the first smart filter and the second smart filter to determine an intersection cardinality of the first logical space unit and the deleted fingerprints. At block 506, the processing logic may determine a cardinality of unique fingerprints in the first logical space unit based at least on the intersection cardinality of the first logical space unit and the deleted fingerprints. At block 507, the processing logic may determine the physical capacity of the first logical space unit based at least on the cardinality of unique fingerprints in the first logical space unit.

Figure 6:
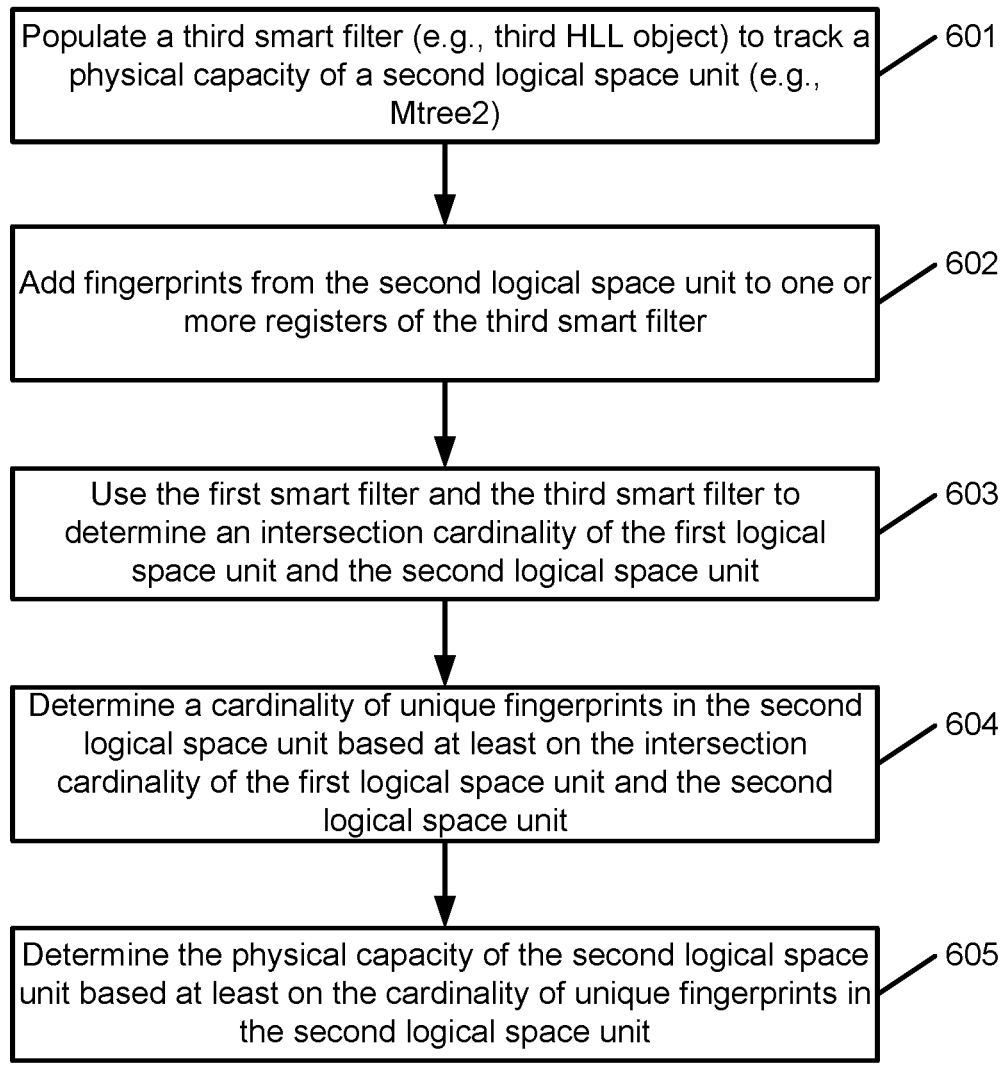
FIG. 6 is a flow diagram illustrating a process of determining a physical capacity of another logical space unit according to an embodiment.

FIG. 6 is a flow diagram illustrating a process of determining a physical capacity of another logical space unit according to an embodiment. Process 600 may be performed by processing logic that includes hardware (e.g. circuitry, dedicated logic, etc.), software (e.g., embodied on a non-transitory computer readable medium), or a combination thereof. For example, process 600 may be performed by system 200 of FIG. 2.

Referring to FIG. 6, at block 601, the processing logic may populate a third smart filter (e.g., third HLL object) to track a physical capacity of a second logical space unit (e.g., Mtree2). At block 602, the processing logic may add fingerprints from the second logical space unit to one or more registers of the third smart filter. At block 603, the processing logic may use the first smart filter and the third smart filter to determine an intersection cardinality of the first logical space unit and the second logical space unit. At block 604, the processing logic may determine a cardinality of unique fingerprints in the second logical space unit based at least on the intersection cardinality of the first logical space unit and the second logical space unit. At block 605, the processing logic may determine the physical capacity of the second logical space unit based at least on the cardinality of unique fingerprints in the second logical space unit.

Figure 7:
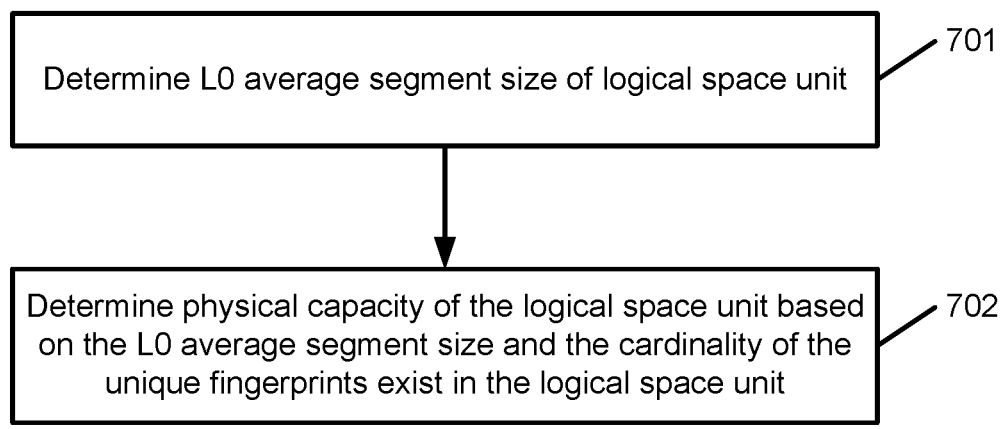
FIG. 7 is a flow diagram illustrating a process of determining a physical capacity of a logical space unit according to another embodiment.

FIG. 7 is a flow diagram illustrating a process of determining a physical capacity of a logical space unit according to another embodiment. Process 700 may be performed by processing logic that includes hardware (e.g. circuitry, dedicated logic, etc.), software (e.g., embodied on a non-transitory computer readable medium), or a combination thereof. For example, process 700 may be performed by system 200 of FIG. 2.

Referring to FIG. 7, at block 701, the processing logic may determine an L0 average segment size of a logical space unit (e.g., Mtree). At block 702, the processing logic may determine a physical capacity of the logical space unit based on the L0 average segment size and the cardinality of the unique fingerprints exist in the logical space unit (as previously described).

Note that some or all of the components as shown and described above (e.g., storage service logic 106 and deduplication logic 107 of FIG. 1, smart filters 210 and physical capacity calculator 209 of FIG. 2, etc.) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
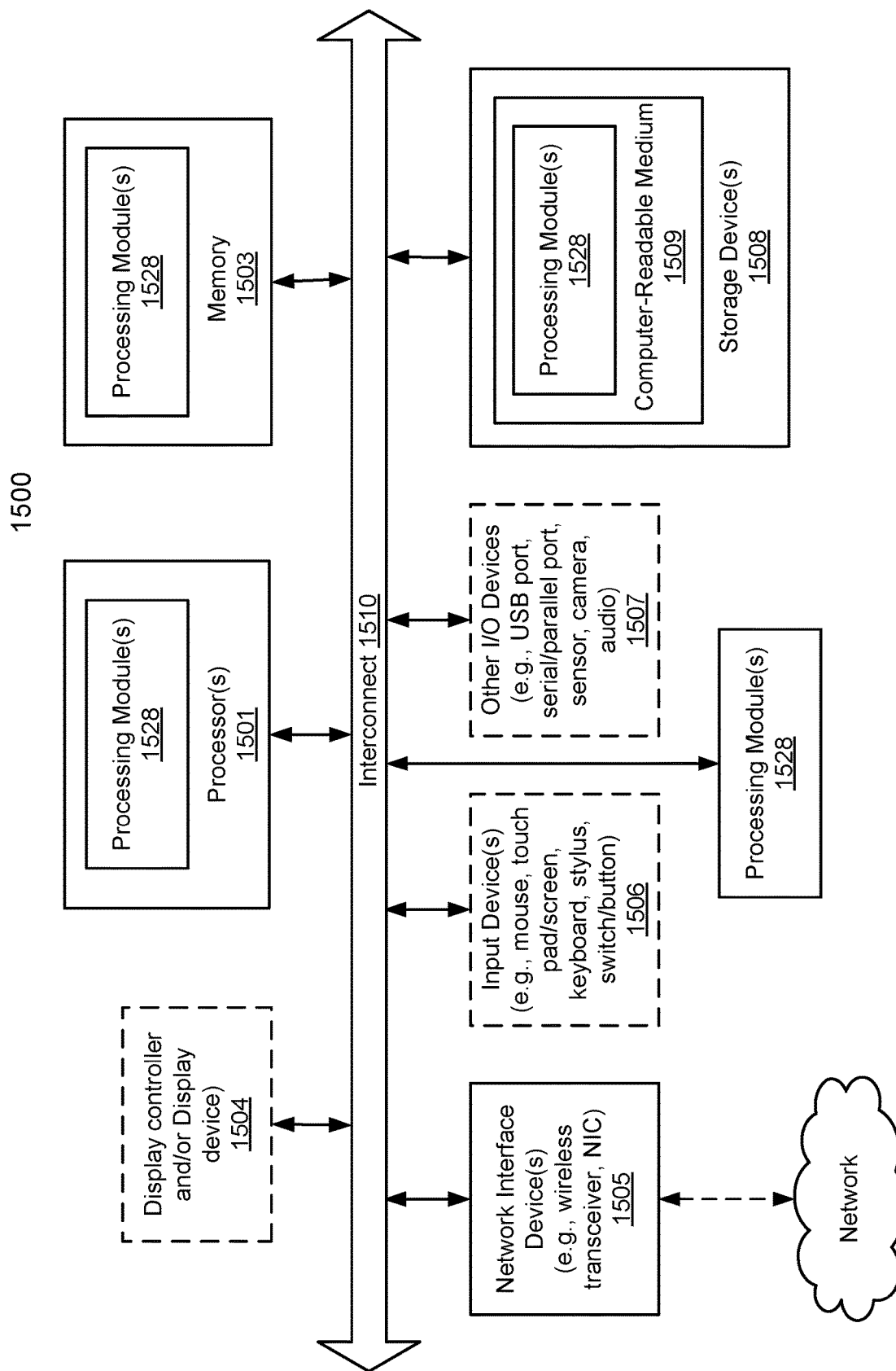
FIG. 8 is a block diagram illustrating a data processing system according to an embodiment.

FIG. 8 is a block diagram illustrating an example of a data processing system which may be used with an embodiment. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic 106, a deduplication engine 107, smart filters 210, physical capacity calculator 209, etc., as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method of determining physical capacity of logical space units in a deduplicated file system, the method comprising:
    populating a first smart filter to track a physical capacity of a first logical space unit;
    adding a plurality of fingerprints from the first logical space unit to one or more registers of the first smart filter;
    populating a second smart filter to track fingerprints to be deleted by garbage collection;
    adding the to be deleted fingerprints to one or more registers of the second smart filter;
    using the first smart filter and the second smart filter to calculate a number of segments in the first logical space unit that are freed by the garbage collection by determining an intersection cardinality of the first logical space unit and the to be deleted fingerprints;
    determining a cardinality of unique fingerprints in the first logical space unit based at least on the intersection cardinality of the first logical space unit and the to be deleted fingerprints; and
    determining the physical capacity of the first logical space unit based at least on the cardinality of unique fingerprints in the first logical space unit.

2. The method of claim 1, wherein
    the method further comprises: using the first smart filter the determine a cardinality of the first logical space unit; and
    determining the cardinality of unique fingerprints in the first logical space unit comprises determining the cardinality of unique fingerprints in the first logical space unit based on (i) the intersection cardinality of the first logical space unit and the to be deleted fingerprints and (ii) the cardinality of the first logical space unit.

3. The method of claim 2, wherein
    the method further comprises: determining an L0 average segment size of the first logical space unit; and
    determining the physical capacity of the first logical space unit comprises determining the physical capacity of the first logical space unit based on (i) the cardinality of unique fingerprints in the first logical space unit and (ii) the L0 average segment size of the first logical space unit.

4. The method of claim 1, wherein determining the intersection cardinality of the first logical space unit and the to be deleted fingerprints comprises:
    using the first smart filter to determine a cardinality of the first logical space unit,
    using the second smart filter to determine a cardinality of the to be deleted fingerprints,
    using the first smart filter to determine a cardinality of a union of the first logical space unit and the to be deleted fingerprints, and
    determining the intersection cardinality of the first logical space unit and the to be deleted fingerprints based on (i) the cardinality of the first logical space unit, (ii) the cardinality of the to be deleted fingerprints, and (iii) the cardinality of the union of the first logical space unit and the to be deleted fingerprints.

5. The method of claim 1, further comprising:
    populating a third smart filter to track a physical capacity of a second logical space unit;
    adding a plurality of fingerprints from the second logical space unit to one or more registers of the third smart filter;
    using the first smart filter and the third smart filter to determine an intersection cardinality of the first logical space unit and the second logical space unit;
    determining a cardinality of unique fingerprints in the second logical space unit based at least on the intersection cardinality of the first logical space unit and the second logical space unit; and
    determining the physical capacity of the second logical space unit based at least on the cardinality of unique fingerprints in the second logical space unit.

6. The method of claim 5, wherein
    the method further comprises: using the third smart filter the determine a cardinality of the second logical space unit, and using the second smart filter to determine a cardinality of the to be deleted fingerprints;
    determining the cardinality of unique fingerprints in the second logical space unit comprises determining the cardinality of unique fingerprints in the second logical space unit based on (i) the intersection cardinality of the first logical space unit and the second logical space unit, (ii) the cardinality of second first logical space unit, and (iii) the cardinality of the to be deleted fingerprints.

7. The method of claim 6, wherein
    the method further comprises: determining an L0 average segment size of the second logical space unit; and
    determining the physical capacity of the second logical space unit comprises determining the physical capacity of the second logical space unit based on (i) the cardinality of unique fingerprints in the second logical space unit and (ii) the L0 average segment size of the second logical space unit.

8. The method of claim 1, wherein the first logical space unit is an Mtree.

9. The method of claim 5, wherein the first, second and third smart filters are implemented using HyperLogLog (HLL) or HLL++.

10. A non-transitory machine-readable medium having instructions stored therein, which when executed by a processor, cause the processor to perform operations, the operations comprising:
   populating a first smart filter to track a physical capacity of a first logical space unit;
   adding a plurality of fingerprints from the first logical space unit to one or more registers of the first smart filter;
   populating a second smart filter to track fingerprints to be deleted by garbage collection;
   adding the to be deleted fingerprints to one or more registers of the second smart filter;
   using the first smart filter and the second smart filter to calculate a number of segments in the first logical space unit that are freed by the garbage collection by determining an intersection cardinality of the first logical space unit and the to be deleted fingerprints;
   determining a cardinality of unique fingerprints in the first logical space unit based at least on the intersection cardinality of the first logical space unit and the to be deleted fingerprints; and
   determining the physical capacity of the first logical space unit based at least on the cardinality of unique fingerprints in the first logical space unit.

11. The non-transitory machine-readable medium of claim 10, wherein
   the operations further comprise: using the first smart filter the determine a cardinality of the first logical space unit; and
   determining the cardinality of unique fingerprints in the first logical space unit comprises determining the cardinality of unique fingerprints in the first logical space unit based on (i) the intersection cardinality of the first logical space unit and the to be deleted fingerprints and (ii) the cardinality of the first logical space unit.

12. The non-transitory machine-readable medium of claim 11, wherein
   the operations further comprise: determining an L0 average segment size of the first logical space unit; and
   determining the physical capacity of the first logical space unit comprises determining the physical capacity of the first logical space unit based on (i) the cardinality of unique fingerprints in the first logical space unit and (ii) the L0 average segment size of the first logical space unit.

13. The non-transitory machine-readable medium of claim 10, wherein determining the intersection cardinality of the first logical space unit and the to be deleted fingerprints comprises:
   using the first smart filter to determine a cardinality of the first logical space unit,
   using the second smart filter to determine a cardinality of the to be deleted fingerprints,
   using the first smart filter to determine a cardinality of a union of the first logical space unit and the to be deleted fingerprints, and
   determining the intersection cardinality of the first logical space unit and the to be deleted fingerprints based on (i) the cardinality of the first logical space unit, (ii) the cardinality of the to be deleted fingerprints, and (iii) the cardinality of the union of the first logical space unit and the to be deleted fingerprints.

14. The non-transitory machine-readable medium of claim 10, wherein the operations further comprise:
   populating a third smart filter to track a physical capacity of a second logical space unit;
   adding a plurality of fingerprints from the second logical space unit to one or more registers of the third smart filter;
   using the first smart filter and the third smart filter to determine an intersection cardinality of the first logical space unit and the second logical space unit;
   determining a cardinality of unique fingerprints in the second logical space unit based at least on the intersection cardinality of the first logical space unit and the second logical space unit; and
   determining the physical capacity of the second logical space unit based at least on the cardinality of unique fingerprints in the second logical space unit.

15. The non-transitory machine-readable medium of claim 14, wherein
   the operations further comprise: using the third smart filter the determine a cardinality of the second logical space unit, and using the second smart filter to determine a cardinality of the to be deleted fingerprints;
   determining the cardinality of unique fingerprints in the second logical space unit comprises determining the cardinality of unique fingerprints in the second logical space unit based on (i) the intersection cardinality of the first logical space unit and the second logical space unit, (ii) the cardinality of second first logical space unit, and (iii) the cardinality of the to be deleted fingerprints.

16. The non-transitory machine-readable medium of claim 15, wherein
   the operations further comprise: determining an L0 average segment size of the second logical space unit; and
   determining the physical capacity of the second logical space unit comprises determining the physical capacity of the second logical space unit based on (i) the cardinality of unique fingerprints in the second logical space unit and (ii) the L0 average segment size of the second logical space unit.

17. The non-transitory machine-readable medium of claim 10, wherein the first logical space unit is an Mtree.

18. The non-transitory machine-readable medium of claim 14, wherein the first, second and third smart filters are implemented using HyperLogLog (HLL) or HLL++.

19. A data processing system, comprising:
   a processor; and
   a memory coupled to the processor to store instructions, which when executed by the processor, cause the processor to perform operations, the operations including:
   populating a first smart filter to track a physical capacity of a first logical space unit;
   adding a plurality of fingerprints from the first logical space unit to one or more registers of the first smart filter;
   populating a second smart filter to track fingerprints to be deleted by garbage collection;
   adding the to be deleted fingerprints to one or more registers of the second smart filter;
   using the first smart filter and the second smart filter to calculate a number of segments in the first logical space unit that are freed by the garbage collection by determining an intersection cardinality of the first logical space unit and the to be deleted fingerprints;

determining a cardinality of unique fingerprints in the first logical space unit based at least on the intersection cardinality of the first logical space unit and the to be deleted fingerprints; and determining the physical capacity of the first logical space unit based at least on the cardinality of unique fingerprints in the first logical space unit.

20. The data processing system of claim 19, wherein the operations further include:

populating a third smart filter to track a physical capacity of a second logical space unit;

adding a plurality of fingerprints from the second logical space unit to one or more registers of the third smart filter;

using the first smart filter and the third smart filter to determine an intersection cardinality of the first logical space unit and the second logical space unit;

determining a cardinality of unique fingerprints in the second logical space unit based at least on the intersection cardinality of the first logical space unit and the second logical space unit; and determining the physical capacity of the second logical space unit based at least on the cardinality of unique fingerprints in the second logical space unit.

* * * * *